(12) United States Patent
Venkataramana et al.

(10) Patent No.: US 12,235,974 B2
(45) Date of Patent: Feb. 25, 2025

(54) ADAPTIVE METADATA ENCRYPTION FOR A DATA PROTECTION SOFTWARE

(71) Applicant: EMC IP Holding Company LLC, Hopkinton, MA (US)

(72) Inventors: Mahesh Reddy Appireddygari Venkataramana, Bangalore (IN); Swaroop Shankar D H, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 17/217,119

(22) Filed: Mar. 30, 2021

(65) Prior Publication Data

US 2022/0318411 A1    Oct. 6, 2022

(51) Int. Cl.
*G06F 21/62* (2013.01)
*G06F 21/56* (2013.01)
*H04L 9/40* (2022.01)

(52) U.S. Cl.
CPC ........... *G06F 21/62* (2013.01); *G06F 21/561* (2013.01); *G06F 2221/033* (2013.01); *H04L 63/04* (2013.01)

(58) Field of Classification Search
CPC ..... G06F 21/50–577; G06F 21/60–629; G06F 2221/033; H04L 63/04–0485
See application file for complete search history.

(56) References Cited

U.S. PATENT DOCUMENTS 9,923,923 B1 * 3/2018 Sharifi Mehr ...... H04L 63/0428
10,706,167 B1 * 7/2020 Sokolov .............. G06F 21/6218
2009/0059915 A1 * 3/2009 Baker ..................... H04L 67/61
                                                        370/389
2019/0332765 A1 * 10/2019 Fu ......................... G06F 21/567
2020/0162438 A1 * 5/2020 Hassan ............... H04L 63/0435

FOREIGN PATENT DOCUMENTS

CN    106936771 A  *  7/2017  ......... H04L 63/0435
EP       3876127 A1  *  9/2021  ........... G06F 21/335

OTHER PUBLICATIONS

K. V. Arya and S. S. Rajput, "Securing AODV routing protocol in MANET using NMAC with HBKS technique," 2014 International Conference on Signal Processing and Integrated Networks (SPIN), Noida, India, 2014, pp. 281-285, doi: 10.1109/SPIN.2014.6776963. (Year: 2014).*

Zhang, Bo, TS Eugene Ng, and Guohui Wang. "Reachability monitoring and verification in enterprise networks." SIGCOMM Poster (2008). (Year: 2008).*

D. Puthal, X. Wu, N. Surya, R. Ranjan and J. Chen, "SEEN: A Selective Encryption Method to Ensure Confidentiality for Big Sensing Data Streams," in IEEE Transactions on Big Data, vol. 5, No. 3, pp. 379-392, Sep. 1, 2019, doi: 10.1109/TBDATA.2017.2702172. (Year: 2019).*

* cited by examiner

*Primary Examiner* — Madhuri R Herzog
(74) *Attorney, Agent, or Firm* — Workman Nydegger

(57) ABSTRACT

One example method includes obtaining hop information of a metadata path for backup metadata, obtaining content sensitivity information indicating a relative sensitivity of backup data to an attack, based on the hop information and the content sensitivity information, selecting an encryption to be applied to the backup metadata, and applying the encryption to the backup metadata. The backup data may be encrypted with the same encryption algorithm that was used to encrypt the backup metadata.

16 Claims, 5 Drawing Sheets

ADAPTIVE METADATA ENCRYPTION FOR A DATA PROTECTION SOFTWARE

FIELD OF THE INVENTION

Embodiments of the present invention generally relate to protection of sensitive data and metadata. More particularly, at least some embodiments of the invention relate to systems, hardware, software, computer-readable media, and methods for adaptive encryption of metadata based on computing environment conditions.

BACKGROUND

With the advent in data protection technology and emphasis on next generation data protection, there is a need for intelligent ways to detect possibilities of security threats to the data being protected. In some cases, rather than the actual data by itself, the metadata may be relatively more vulnerable to ransomware attacks. This may especially be so in instances where there is a network level hop, or geographical hop, during the metadata transmission from a data source to a target where the data is to be backed up. In such as case, it may not be adequate to provide the same level of encryption to the metadata as to the backup data.

Furthermore, in cases where the backed up data is being encrypted with a high level of security, but metadata is not relatively more vulnerable to attacks, then the performance penalty on the host would be high to have the metadata being encrypted with same level of security as the underlying data. Current data protection solutions are not considerate with regard to the location of data, sensitivity of the data, network level hops of the metadata associated, and are not effective enough in using the route trace abilities to decide the metadata encryption levels needed.

For example, in a hybrid environment with a high level sensitive data which has all of the data path and metadata path within the same network or without any hop, then the metadata may not need to be protected with the same level of encryption as the data backed up because the vulnerability of the metadata is relatively low, due to the lack of hops in the metadata path. However, conventional data protection solutions are not configure to discriminate in this way. Instead, in such conventional approaches, the metadata also would be protected with same level of encryption as the backed up data.

As another example, in a situation where data of a medium sensitivity level is being protected, and the associated metadata path involves multiple hops, there may a relatively high chance of the metadata being compromised. Thus, in this example, the metadata may require an additional level of security relative to the security level of the data, even though the data is of medium or low level of sensitivity and, as such, has a relatively lower sensitivity than the metadata. Finally, in a case where multiple virtual machine (VM) workloads are being protected, there may be a need to assess the sensitivity of the heterogeneous data that is encapsulated within the workload and apply a relevant encryption algorithm to be effective in terms of performance on the host.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
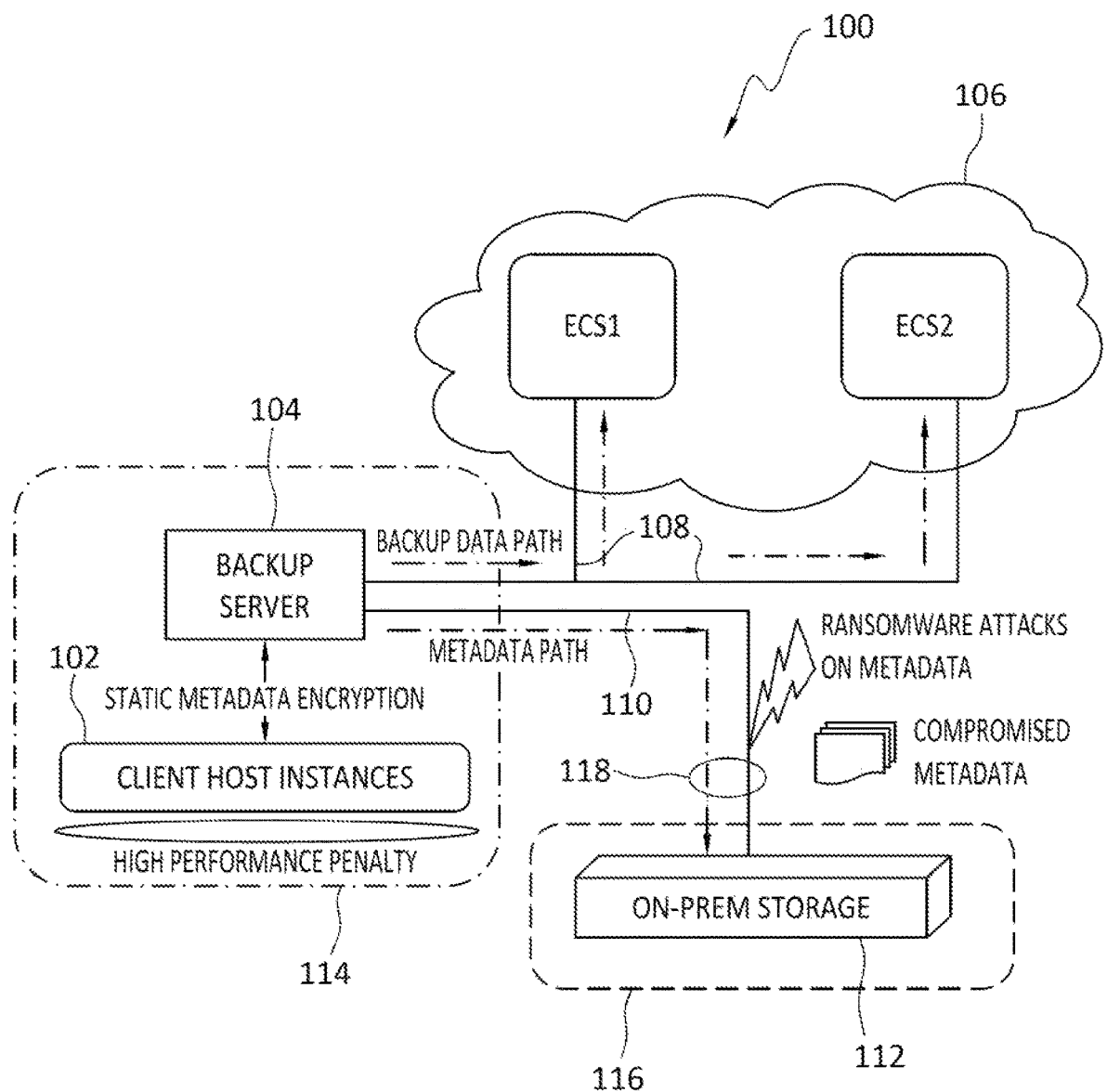
FIG. 1 discloses aspects of a hypothetical comparative example illustrating a high performance penalty circumstance.

Embodiments of the present invention generally relate to protection of sensitive data and metadata. More particularly, at least some embodiments of the invention relate to systems, hardware, software, computer-readable media, and methods for adaptive encryption of metadata based on computing environment conditions, and some example embodiments may be particularly useful in defeating ransomware attacks involving unauthorized access to metadata.

For example, problems such as those noted earlier have led to a gap in functionality, which may be remedied by example embodiments directed to an adaptive encryption system that can smartly decide the level of security for each metadata path that has to be applied to metadata, in specific, considering the performance penalty as a trade-off. In more detail, example embodiments embrace approaches that utilize a content analysis SDK (Software Development Kit) and a hop tracer to determine, respectively, the sensitivity of backed up data, and to determine the number of hops, such as network hops, for the metadata. With this information, a two dimensional analysis may be performed to identify an efficient and effective algorithm to be applied for encryption of the metadata so that the performance penalty imposed on the host by metadata encryption is kept at an acceptable level, while also providing for adequate metadata security.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may identify an acceptable tradeoff between metadata security, and a metadata encryption workload imposed on a host. An embodiment may adaptively encrypt the metadata in order to reduce the redundant performance penalty on a host due to a static encryption of metadata. An embodiment may automatically adapt to changes in metadata security requirements and data security requirements to identify an efficient approach to metadata encryption without imposing an undue encryption burden on a host. An embodiment may help to reduce, or eliminate, the effectiveness of ransomware attacks through a custom approach to metadata encryption. An embodiment of the invention may comprise next generation data protection software empowered to be smart and dynamic in being resilient to ransomware attacks while effectively performing on the host under usage.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which, for example, data streams of large amounts of data, such as millions or billions of bits for example, may be handled and processed by a computing system. Such handling and processing, including data encryption, metadata encryption, and hop analysis, for example, is well beyond the mental capabilities of any human to perform practically, or otherwise, with such large amounts of data. Thus, while other, simplistic, examples may be disclosed herein, those are only for the purpose of illustration and to simplify the discussion. Accordingly, nothing herein should be construed as teaching or suggesting that any aspect of any embodiment of the invention could or would be performed, practically or otherwise, in the mind of a human.

A. Comparative Example

With reference now to FIG. 1, a comparative hypothetical configuration 100 is presented for the purposes of aiding in the illustration of aspects of some example embodiments, such as the example embodiments disclosed in FIGS. 2 and 3, discussed below. In general, the configuration 100 may comprise various client host instances 102 that may host applications that generate data which will be backed up at some point. As part of a backup process, the client host instances 102 may encrypt metadata that is associated with the data that is to be backed up. In a simple case, the same encryption method, and strength of encryption, may be employed both for the data and the metadata. This approach may be referred to as constituting static metadata encryption, since the encryption of the metadata employs the same method and strength as the encryption of the data with which the metadata is associated. However, static metadata encryption may impose host instance 102 performance penalties and/or other problems.

As further indicated in FIG. 1, a backup server 104 may transmit backup data to a cloud storage site 106 along a backup data path 108. As well, the backup server 104 may also transmit metadata relating to the backup data along a metadata path 110 to a destination other than the cloud storage site 106, such as an on-premises storage site 112 for example. Thus, in this illustrative example, the data path 108 extends into the cloud and the metadata path 110 extends into another data zone with on-premises storage site 112. As shown, the metadata traveling along the metadata path 110 may be vulnerable to attack, such as ransomware attacks for example. That is, part of the metadata path 110 that extends from a first data zone 114, that includes the backup server 104, to a second data zone 116, that includes the on-premises storage site 112, may be exposed and vulnerable to such attacks. For example, part of the metadata path 110 may pass through a one or more zones 118 that may comprise unsecure elements such as a public network and/or other unsecure networks and devices, where the metadata may be vulnerable to attack. If the metadata has not been protected by adequate encryption, such attacks could result in compromised metadata.

A relatively easy approach to this circumstance might be to encrypt the metadata without regard or reference to its criticality. To illustrate, may be ideal to use a strong encryption method for the backup data which will overload the processing resources of the host instances 102, and if the encryption is compromised to reduce the processor performance penalty, then the critical metadata, as well as the backup data, may also be encrypted relatively loosely to avoid performance penalty. As a result, whether the metadata has a low, medium or high sensitivity to attack, and regardless of whether the metadata is passing through a data zone, or within the same data zone without any hops, the metadata will be strongly encrypted with a resulting high performance penalty, or will be made vulnerable to attackers if the encryption strength is traded off for a reduced performance penalty. As the comparative example of FIG. 1 thus illustrates, it may be problematic to perform metadata encryption without regard to performance penalty, or metadata vulnerability.

B. Aspects of Some Example Embodiments

Figure 2:
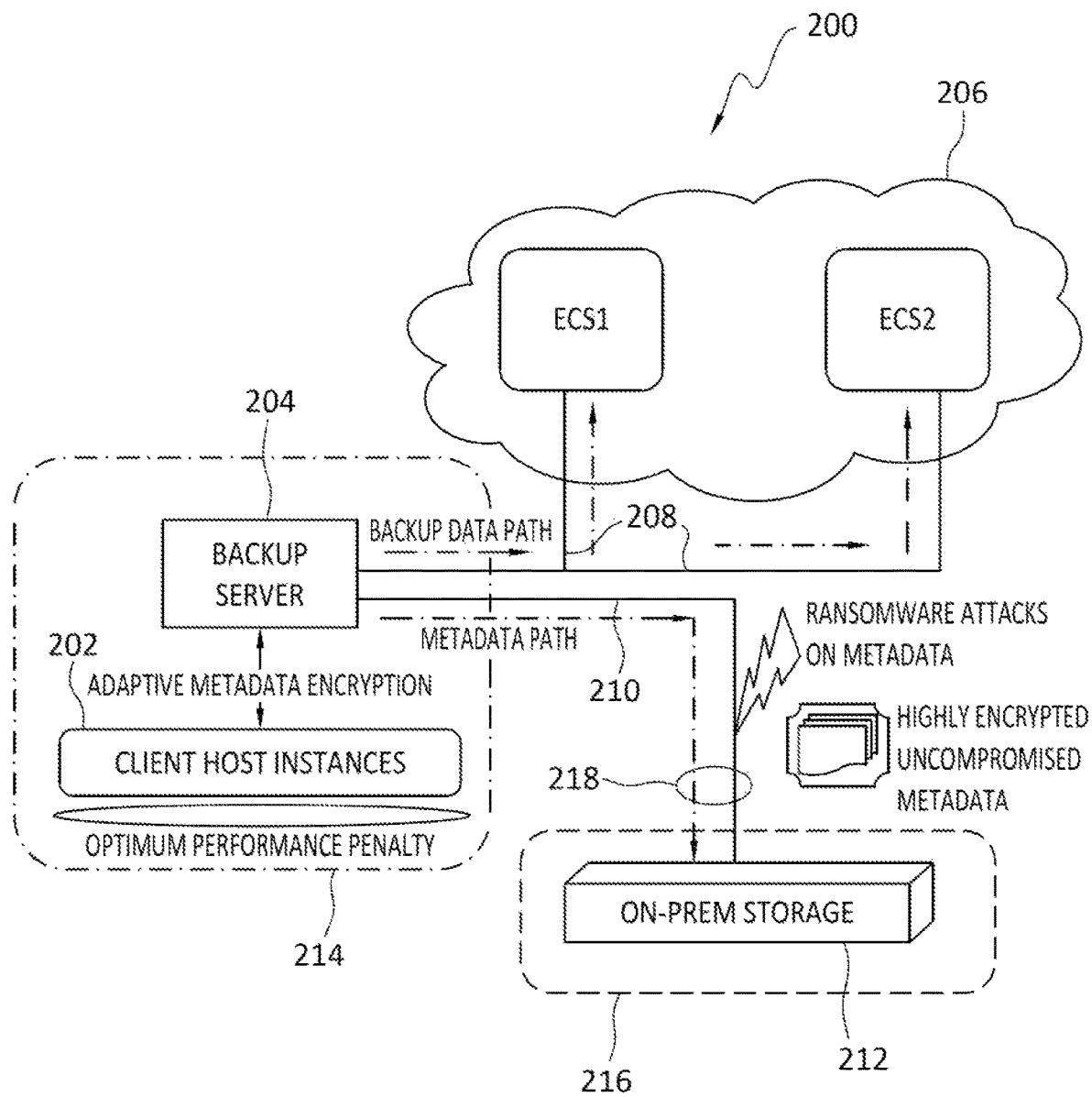
FIG. 2 discloses aspects of a configuration with an optimum performance penalty.

With the comparative example of FIG. 1 in view, attention is directed now to FIG. 2 which discloses aspects of some example embodiments. The configuration 200 may be similar, or identical, to the configuration 100, although that is not necessarily required. As indicated, the configuration 200 may include one or more client host instances 202 that communicate with a backup server 204 that is operable to back up data to a cloud storage site 206.

It is noted that, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With continued reference now to the example of FIG. 2, backup data may travel along backup data paths 208 that extend between the backup server 204 and cloud storage site 206, and metadata may travel along a metadata path 210 that extends between the backup server 204 and an on-premises storage site 212. The metadata path 210 may extend between a first data zone 214 and a second data zone 216. In some instances, the metadata path 210 may pass through one or more unsecure zones 218 that lie between the first data zone 214 and second data zone 216. When passing through an unsecure zone 218, such as a public network or public devices for example, the metadata may be subject to attack. Such attacks may comprise, for example, ransomware attacks.

In some instances, the data zone 214 and data zone 216 may be contiguous to each other, or overlap each other, or may be combined together to form one continuous zone. In cases such as the three aforementioned examples, the metadata may have a low, or no, vulnerability to attack since it is always in a data zone controlled by the owner of the client host 202 instances and on-premises storage 212.

Each time that a piece of metadata travels from one node to another node in a path may be referred to as a hop. As used herein, a node may refer to a data zone, a network, a device, a computing entity, or any combination of these. In general, the more hops that a piece of metadata makes, the likely that the metadata will be subjected to an attack at some point along its path. The potential vulnerability of the metadata may additionally, or alternatively, be a function of the nature of the path that the metadata travels. For example, and as noted above, a public network may form part of a metadata path, and because the network is public, the metadata may be exposed to attack when traveling on that part of the metadata path.

Note that reference may be made herein to the relative sensitivity of backup data, and backup metadata, to attack by bad actors, malicious code, and/or other threats. A low sensitivity embraces the notion that unencrypted data or metadata is relatively invulnerable to attack while, on the other hand, a high sensitivity embraces the notion that unencrypted data or metadata is relatively vulnerable to attack. Thus, data and/or metadata of relatively high sensitivity may require relatively stronger encryption than data and/or metadata of relatively low sensitivity.

In at least some instances, the relative vulnerability of data and/or metadata may stem from the extent to which that data and/or metadata remains in an environment controlled by the owner of the data and/or metadata, or resides, even only temporarily, in an environment that is not controlled by the owner of the data and/or metadata. Due to the relation between the backup data and the associated backup metadata, an attacker may be able to gain access to the underlying backup data if the attacker can successfully attack the backup metadata. For the purposes of illustration, a sensitivity scale of 1 to 5 may be employed where relatively low sensitivity is denoted by 1-2, a medium sensitivity may be denoted by 3, and relatively high sensitivity is denoted by 4-5. Such a scale is for purposes of illustration, and is not intended to limit the scope of the invention in any way.

In a case where, for example, metadata has a medium level sensitivity, or vulnerability to attack, overloading of an associated client host instance 202 due to metadata encryption processes may be reduced, or avoided, by either choosing not to encrypt the metadata at all, or performing only a weak encryption on the metadata if the metadata only ever travels in the same data zone as the client host instance 202. In another case, where the metadata where the metadata path 210 is going to have a number of hops between, for example, the backup server 204 and target device, such as on-premises storage 212, the metadata may be strongly encrypted, even if the metadata has only a medium sensitivity. This encryption of the metadata may be necessary due to its potential vulnerability to attack which, as noted above, may be a function of the number of hops in the metadata path. The encryption level of the metadata may be determined independently of, that is, without reference or regard to, the encryption level implemented with respect to the backup data to which the metadata relates.

Figure 3:
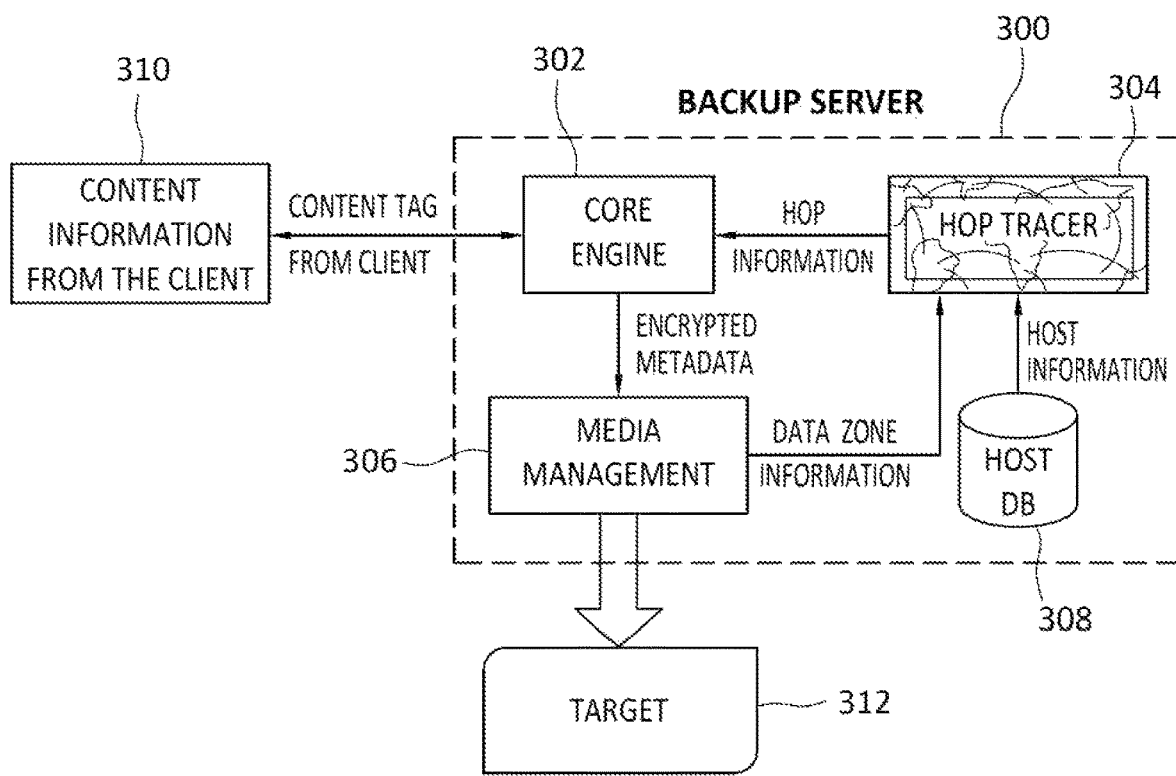
FIG. 3 discloses aspects of an example backup server according to some embodiments.

With continued attention to FIG. 2, and directing attention now to FIG. 3, aspects of an example backup server 300 according to some embodiments are disclosed. As shown, the backup server 300 may include a core engine 302 that receives hop information from a hop tracer 304, and the core engine 302 may provide encrypted metadata to a media management unit 306. The hop tracer 304 may receive data zone information from the media management unit 306, and may also receive host information from a host DB 308. The core engine 302 may receive, for example, content information 310 from a client, and the content information 310 may take the form, for example, of content tags. Finally, an output of the media management unit 306, such as the encrypted data and encrypted metadata, may be provided, that is, backed up, to one or more targets 312. Further details concerning the aforementioned components and their operation are provided in the following discussion.

Initially, the core engine 320 may receive the content information 310 from a backup agent at a client. Concurrently, or at another time, hop information may be fed from the hop tracer 304 to the core engine 302. At the core engine 302, timely fed information for each backup policy cycle may be considered and the encryption level on the metadata relating to the backup data accordingly determined and set.

The core engine 302 may implement a comparator configuration that determines a metadata encryption level. The metadata encryption level may be determined based on both the sensitivity of content such as the backup data to which the metadata pertains, and on the number of hops in the metadata path extending from the backup server to the target device. Using these inputs, the comparator configuration of the core engine 302 may then determine an encryption level for the metadata that takes these inputs into consideration, and which, when implemented, does not overtax the resources of the entity that will perform the metadata encryption. Thus, in at least some example embodiments, a metadata encryption level that is selected and implemented for metadata pertaining to data of a backup dataset may be based on three elements, namely, (i) content sensitivity, (ii) the number of hops in the metadata path, and (iii) efficient and effective use of processing resources of the entity that will perform the metadata encryption.

Consider, for instance, an example of a data zone where an application is running on-premise, but the target device of the backup path is located at a cloud storage site, and the metadata is in another data zone that is located on-premise. When the backup is completed, the metadata may be routed to the data zone, which may require multiple hops from the cloud, such as if the backed up host is in a cloud storage environment, or an on-prem data zone if the data being backed up is on-prem, to the backup agent data zone and then to the target medium on-premise.

In cases such as this, the metadata may have to be encrypted with a relatively robust algorithm since the chance of attack may be relatively high during one or more of the hops. However, if the data that was backed up and could be compromised upon the attack on the metadata were of very low sensitivity, the encryption algorithm for the data need not be particularly robust. In this illustrative example then, a two dimensional ambiguity is presented in which one dimension calls for relatively robust encryption, while the other dimension does not require particularly robust encryption.

So, in such a two dimensional ambiguity for heterogeneous cases, the core engine 302 may consider both the number of hops of the metadata path from the backup server to the target, as well as considering the sensitivity of the backed up data, in order to be effective in terms of performance on the client host instance, that is, in order to identify a metadata encryption level that provides adequate protection to the metadata without imposing an unacceptable performance penalty on the client host encryption resources.

In another instance, suppose that the data being backed up is relatively highly sensitive, but the number of hops in the metadata path are zero, then the core engine 302 may, based on the high level sensitivity of the backup data, encrypt the metadata also with a highly secure encryption algorithm, which may, or may not, be the same algorithm used to encrypt the backup data. However, if the data sensitivity were medium, and the number of hops were zero, then the metadata and the backup data may be encrypted with a basic AES algorithm since the vulnerability of the metadata is relatively low. Thus, in these examples, metadata sensitivity, which may be a function of the number of hops in the metadata path, and/or the data sensitivity may be the determining factors in selection of an encryption level for the metadata and the backup data.

In some embodiments, the same level of encryption may be applied to both the backup data and the associated metadata, while in other embodiments, different respective encryption levels may be applied to the backup data and the associated metadata. For example, if the backup data is highly sensitive, but there are zero hops in the metadata path, a relatively low level of encryption may be applied to the metadata, and a relatively higher level of encryption applied to the backup data. In another example, if the backup data has a relatively low sensitivity, but there are multiple hops in the metadata path, a relatively high level of encryption may be applied to the metadata, and a relatively lower level of encryption applied to the backup data.

In general then, at least some example embodiments of the algorithm may consider the number of hops in a backup metadata path, versus the backup data sensitivity, to identify and apply an effective metadata encryption level that provides adequate protection to the metadata without imposing an unacceptable performance penalty on the entity that performs the encryption processes on the backup data and the metadata. In some embodiments, the media management unit 306 may have all the necessary details of the target host for both the backup data path and the metadata path, and those details may be hosted, for example, in the host information database 308. This host information database may be utilized by the hop tracer 304, which may utilize a look-back trace algorithm, such as packet marking, or tracert, for example, to query the metadata and/or backup data route information and retrieve the TTL (Time To Live), or hop limit, value for each hop of the packet and determine the number of hops. Also, the hop tracer 304 implementation may be readily pluggable with an open source SDK (Software Development Kit), such as tracerouteNG for example, which may empower the backup server 300 to be able to retrieve the number of hops for a piece metadata through metadata path and provide the same to the core engine 302 for further usage.

C. Example Methods

Figure 4:
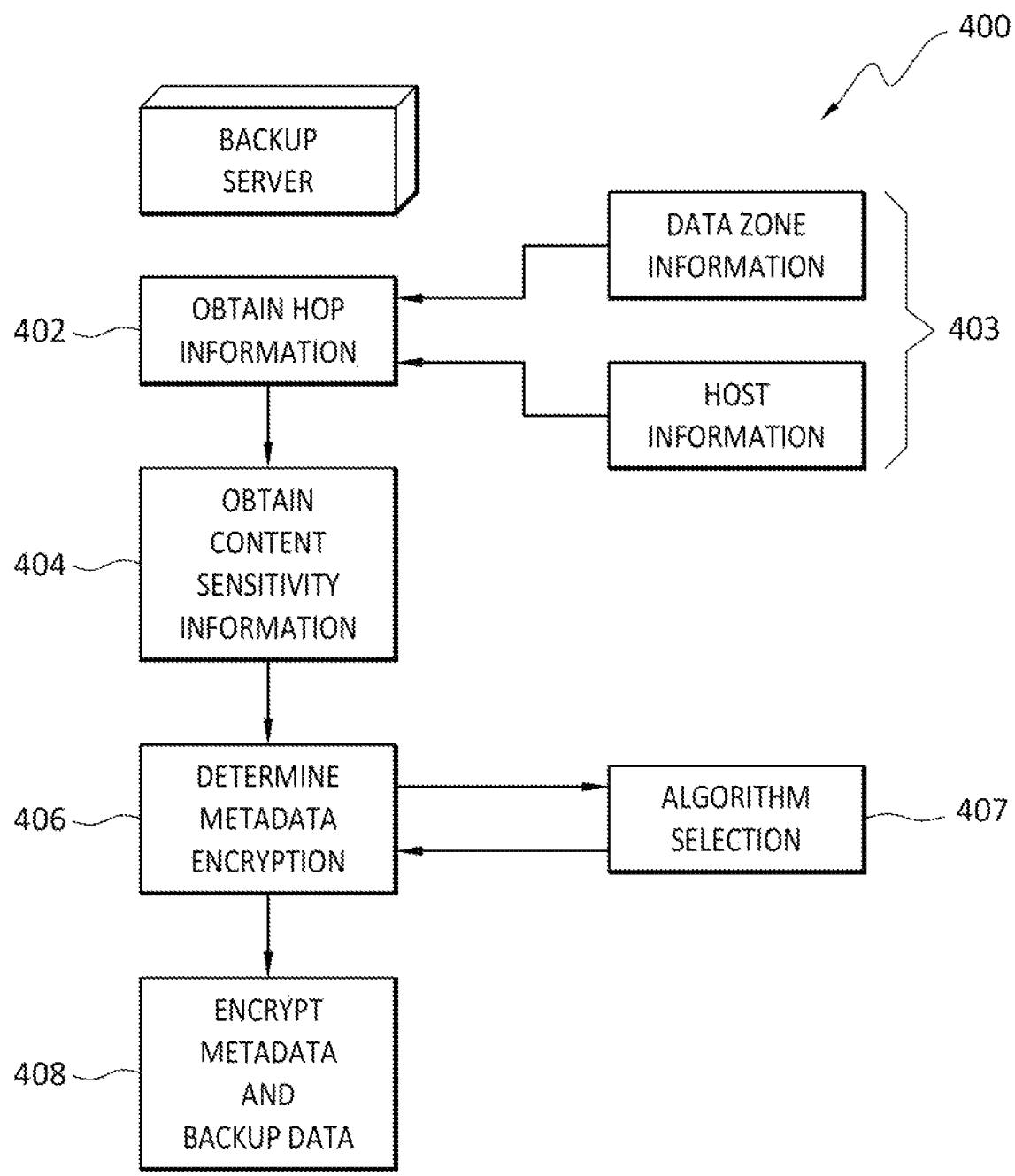
FIG. 4 discloses aspects of an example method.

It is noted with respect to the example method of FIG. 4 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 4, one example method according to some embodiments is denoted generally at 400. Part or all of the method 400 may be performed by a backup server, but that is not necessarily required. While not specifically indicated in FIG. 4, a backup server may include a backup application that cooperates with a backup agent at a client host to define and create content, such as a backup dataset for example.

The method 400 may begin at 402, at which point a backup dataset and associated backup metadata may have already been created, with the obtaining of hop information concerning a metadata path along which the backup metadata is expected to pass. Information 403 about the client host and/or data zone(s) through which the metadata may pass may also be obtained and used by a hop tracer to generate the hop information. Before, or after, or at the same time as, the hop information has been obtained 403, content sensitivity information may be obtained 404.

Based on both the hop information and the content sensitivity information, a determination may then be made 406 as to the level of encryption that will be applied to the metadata. In at least some instances, a particular encryption algorithm may be selected 407.

Finally, the content, such as backup data, and the metadata, may then be encrypted 408 based on the outcome of the process 406. In at least some embodiments, the encryption applied to the content may be a function of the encryption applied to the metadata. For example, if a relatively strong encryption is applied to the metadata, the same encryption may also be applied to the backup data. As well, the encryption applied to the metadata may be a function of the encryption applied to the content. For example, if there are zero hops, but the data is highly sensitive, a high level of encryption may be applied 408 to the data and to the metadata.

D. Further Example Embodiments

Following are some further example embodiments of the invention. These are presented only by way of example and are not intended to limit the scope of the invention in any way.

Embodiment 1. A method, comprising: obtaining hop information of a metadata path for backup metadata; obtaining content sensitivity information indicating a relative sensitivity of backup data to an attack; based on the hop information and the content sensitivity information, selecting an encryption to be applied to the backup metadata; and applying the encryption to the backup metadata.

Embodiment 2. The method as recited in embodiment 1, wherein the metadata path extends from a backup server to a target storage site.

Embodiment 3. The method as recited in any of embodiments 1-2, wherein the hop information identifies a number of hops taken by the backup metadata as the backup metadata travels the metadata path.

Embodiment 4. The method as recited in any of embodiments 1-3, further comprising applying the same encryption to the backup data as was applied to the backup metadata.

Embodiment 5. The method as recited in any of embodiments 1-4, wherein the attack comprises a ransomware attack.

Embodiment 6. The method as recited in any of embodiments 1-5, wherein the encryption is selected based in part on a performance penalty that will be imposed on a host by performance of the encryption by the host.

Embodiment 7. The method as recited in any of embodiments 1-6, wherein when the hop information meets or exceeds a threshold, the encryption is relatively stronger than encryption used when the hop information is below the threshold.

Embodiment 8. The method as recited in any of embodiments 1-7, wherein when the hop information is below a threshold, the encryption is selected in accordance with the content sensitivity information.

Embodiment 9. The method as recited in any of embodiments 1-8, wherein the hop information is derived in part from data zone information concerning one or more data zones through which the backup metadata passes and/or host information regarding a host that performs the encryption.

Embodiment 10. The method as recited in any of embodiments 1-9, wherein the method is performed by a backup server.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
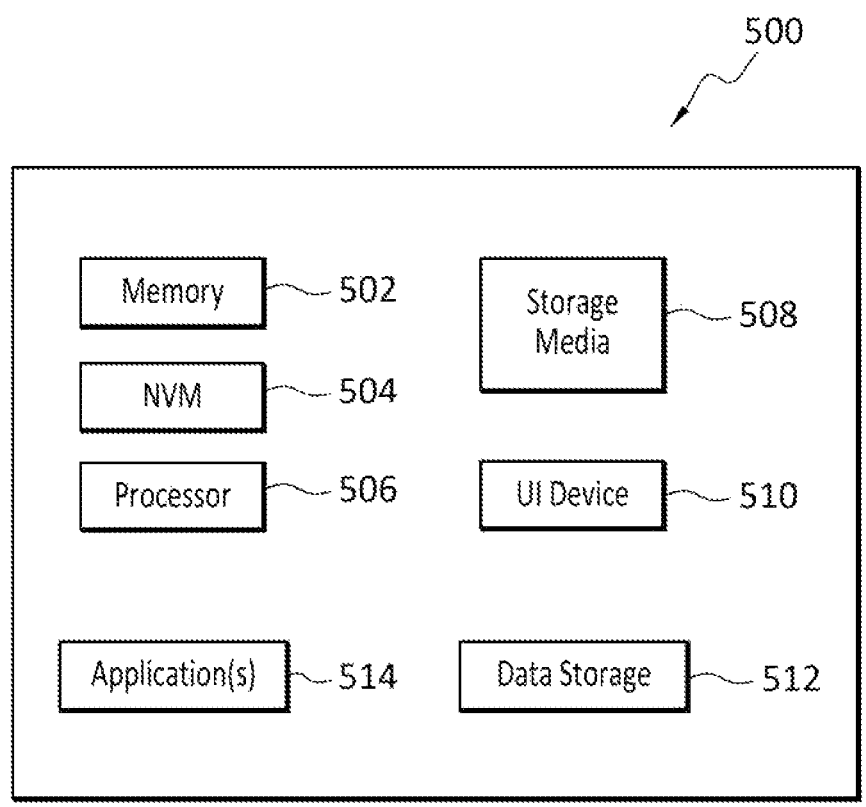
FIG. 5 discloses aspects of a computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 5r12. One or more of the memory components 502 of the physical computing device 500 may take the form of solid state device (SSD) storage.

As well, one or more applications 5r14 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   obtaining hop information of a metadata path for backup metadata, wherein the metadata path extends from a backup server to a target storage site, and the hop information is derived in part from data zone information and includes information indicating an extent to which the backup metadata is vulnerable to attack at each hop in the metadata path;
   obtaining content sensitivity information indicating a relative sensitivity of backup data to an attack;
   based on the information indicating the extent to which the backup metadata is vulnerable to attack at each hop in the metadata path, an efficiency of an encrypting processing resource, a performance penalty, and the content sensitivity information, selecting an encryption to be applied to the backup metadata, wherein the performance penalty is imposed on a host by performance of the encryption by the host; and
   applying, by the encrypting processing resource, the encryption to the backup metadata.

2. The method as recited in claim 1, wherein the hop information identifies a number of hops taken by the backup metadata as the backup metadata travels the metadata path.

3. The method as recited in claim 1, further comprising applying the same encryption to the backup data as was applied to the backup metadata.

4. The method as recited in claim 1, wherein the attack comprises a ransomware attack.

5. The method as recited in claim 1, wherein when the hop information meets or exceeds a threshold, the encryption is relatively stronger than encryption used when the hop information is below the threshold.

6. The method as recited in claim 1, wherein when the hop information is below a threshold, the encryption is selected in accordance with the content sensitivity information.

7. The method as recited in claim 1, wherein the data zone information includes one or more data zones through which the backup metadata passes and/or host information regarding a host that performs the encryption.

8. The method as recited in claim 1, wherein the method is performed by a backup server.

9. A non-transitory computer readable storage medium having stored therein instructions that are executable by one or more hardware processors to perform operations comprising:
   obtaining hop information of a metadata path for backup metadata, wherein the metadata path extends from a backup server to a target storage site, and the hop information is derived in part from data zone information and includes information indicating an extent to which the backup metadata is vulnerable to attack at each hop in the metadata path;
   obtaining content sensitivity information indicating a relative sensitivity of backup data to an attack;
   based on the information indicating the extent to which the backup metadata is vulnerable to attack at each hop in the metadata path, an efficiency of an encrypting processing resource, a performance penalty, and the content sensitivity information, selecting an encryption to be applied to the backup metadata, wherein the performance penalty is imposed on a host by performance of the encryption by the host; and
   applying, by the encrypting processing resource, the encryption to the backup metadata.

10. The non-transitory computer readable storage medium as recited in claim 9, wherein the hop information identifies a number of hops taken by the backup metadata as the backup metadata travels the metadata path.

11. The non-transitory computer readable storage medium as recited in claim 9, wherein the operations further comprise applying the same encryption to the backup data as was applied to the backup metadata.

12. The non-transitory computer readable storage medium as recited in claim 9, wherein the attack comprises a ransomware attack.

13. The non-transitory computer readable storage medium as recited in claim 9, wherein when the hop information meets or exceeds a threshold, the encryption is relatively stronger than encryption used when the hop information is below the threshold.

14. The non-transitory computer readable storage medium as recited in claim 9, wherein when the hop information is below a threshold, the encryption is selected in accordance with the content sensitivity information.

15. The non-transitory computer readable storage medium as recited in claim 9, wherein the data zone information includes one or more data zones through which the backup metadata passes and/or host information regarding a host that performs the encryption.

16. The non-transitory computer readable storage medium as recited in claim 9, wherein the operations are performed by a backup server.

* * * * *